United States Patent
Wichlund et al.

(10) Patent No.: US 9,100,080 B2
(45) Date of Patent: Aug. 4, 2015

(54) DIGITAL RADIOS

(71) Applicant: NORDIC SEMICONDUCTOR ASA, Trondheim (NO)

(72) Inventors: Sverre Wichlund, Trondheim (NO); Stein Erik Weberg, Heimdal (NO); Ingil Sundsbo, Saupstad (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 0 days.

(21) Appl. No.: 14/267,116

(22) Filed: May 1, 2014

(65) Prior Publication Data
US 2014/0334573 A1    Nov. 13, 2014

(30) Foreign Application Priority Data

May 8, 2013    (GB) .................................. 1308258.1

(51) Int. Cl.
| | |
|---|---|
| H03H 7/30 | (2006.01) |
| H03H 7/40 | (2006.01) |
| H03K 5/159 | (2006.01) |
| H04B 1/12 | (2006.01) |
| H04L 27/00 | (2006.01) |
| H04L 27/36 | (2006.01) |
| H04L 27/38 | (2006.01) |

(52) U.S. Cl.
CPC .............. *H04B 1/12* (2013.01); *H04L 27/0014* (2013.01); *H04L 27/364* (2013.01); *H04L 27/3827* (2013.01); *H04L 2027/003* (2013.01)

(58) Field of Classification Search
CPC .... H04B 1/12; H04L 27/0014; H04L 27/364; H04L 27/3827; H04L 2027/003; H04L 2027/0038; H04L 2027/004; H04L 2027/0042
USPC .................. 375/235, 344, 345, 324, 325, 326
See application file for complete search history.

(56) References Cited

U.S. PATENT DOCUMENTS 6,483,883 B1 *  11/2002  Iemura ........................... 375/345

* cited by examiner

*Primary Examiner* — Phuong Phu
(74) *Attorney, Agent, or Firm* — Koppel, Patrick, Heybl & Philpott

(57) ABSTRACT

A digital radio receiver comprises:
a first section arranged to receive an analog radio signal and to generate therefrom digital intermediate frequency I and Q channel samples,
a second section arranged to convert said I and Q channel samples to a lower, baseband frequency, said second section comprising:
a first coordinate rotation digital computer module arranged to perform a complex rotation of the I channel samples;
a second coordinate rotation digital computer module arranged to perform a complex rotation of the Q channel samples;
a phase accumulator arranged to provide an output signal representing a complex rotation to be applied to each of the I and Q channel samples,
wherein the second section is arranged such that the phase accumulator output signal is modified by a phase offset signal prior to being supplied to one of the first and second coordinate rotation digital computers.

7 Claims, 4 Drawing Sheets

FIG 2 – Prior Art

DIGITAL RADIOS

This invention relates to digital radios and more particularly to digital complex rotators.

A digital complex rotator module is a known part of a digital receiver architecture. Where the architecture includes a non-zero intermediate frequency (IF), one of the roles of this module is to down-mix (with image rejection) the incoming IF quadrature (I&Q) samples to a lower, baseband frequency. Another role of such a module is to support coherent demodulation by de-rotating the I&Q samples to compensate for an estimated carrier frequency offset and carrier phase offset. The modules in which the estimation of carrier frequency offset and carrier phase offset are performed thus form, with the complex rotator module, circuitry for recovery of the (digital) carrier.

Such complex rotator modules can be implemented with a Coordinate-Rotation-Digital-Computer (CORDIC). This is an efficient iterative algorithm for trigonometric calculations which is known per se. An important factor in achieving this efficiency is that typically the only operations used by a CORDIC are addition, bit-shifts and table lookups. However, in such implementations the I&Q samples will inevitably suffer from analogue gain and phase mismatch between them. This gain and phase mismatch between the I and Q channels must be compensated for to ensure adequate image rejection. Such compensation can be achieved but requires complex multiplications along with table lookups which is not very flexible, for example in accommodating different intermediate frequencies.

The present invention seeks to provide an alternative and when viewed from a first aspect the invention provides a digital radio receiver comprising:

a first section arranged to receive an analogue radio signal and to generate therefrom digital intermediate frequency I and Q channel samples, a second section arranged to convert said I and Q channel samples to a lower, baseband frequency, said second section comprising:

a first coordinate rotation digital computer module arranged to perform a complex rotation of the I channel samples;

a second coordinate rotation digital computer module arranged to perform a complex rotation of the Q channel samples;

a phase accumulator arranged to provide an output signal representing a complex rotation to be applied to each of the I and Q channel samples, wherein the second section is arranged such that the phase accumulator output signal is modified by a phase offset signal prior to being supplied to one of the first and second coordinate rotation digital computers.

Thus it will be seen by those skilled in the art that in accordance with the invention two coordinate rotation digital computer modules (hereinafter "CORDICs") are employed, one for each quadrature channel, which allows phase offset compensation to be applied by applying an appropriate phase offset signal to one of the CORDICs. It will be appreciated that the result of the phase offset signal is that there is a net difference in the complex rotation which the two respective CORDICs are directed to apply. This may provide a more straightforward way of achieving phase mismatch compensation than those proposed in the prior art. Accordingly it is preferred that said complex rotation is determined by a measured phase offset between the analogue radio signal and a nominal phase of said signal. Embodiments of the invention allow a choice of intermediate frequencies relative to the sampling rate, including the case where the IF is zero.

The digital radio receiver may comprise, or be in communication with, means for measuring a phase mismatch between said I and Q channels and using said phase mismatch to generate said phase offset signal. This would allow dynamic phase mismatch compensation. Alternatively in another set of embodiments the phase mismatch may be measured in a calibration phase—e.g. during production at a fabrication plant or testing facility. In such cases the phase offset signal may be fixed.

In a set of embodiments the digital radio receiver comprises an amplifier arranged to apply a compensatory gain to an input or output of one of the first and second coordinate rotation digital computers. In accordance with such embodiments a mismatch in the respective gains of the I and Q channels may be compensated for. Theoretically a gain could be applied to the input and/or output of one or both CORDICs such that the net overall gain differs between them. In a set of embodiments however a gain is only applied to one of the CORDICs. Conveniently this may the same CORDIC to which the phase offset signal is applied but this is not essential. In a set of embodiments the compensatory gain is applied to the input of the CORDIC.

Preferably one of the inputs of each CORDIC is held at zero. As is demonstrated later this allows them to recreate the operation of a single CORDIC but with phase mismatch compensation. This can also simplify implementation as logic synthesis may exploit the fact that one of each of the CORDIC inputs is constant zero.

As for the phase mismatch compensation, the digital radio receiver may comprise, or be in communication with, means for measuring a gain mismatch between the I and Q channels and using said gain mismatch to determine the compensatory gain. This would allow dynamic gain mismatch compensation. Alternatively in another set of embodiments the gain mismatch may be measured in a calibration phase—e.g. during production at a fabrication plant or testing facility. In such cases the compensatory gain may be fixed.

The digital radio receiver may be embodied using, at least partly, discrete components but in a set of embodiments comprises an integrated circuit.

An embodiment of the invention will now be described, by way of example only, with reference to the accompanying drawings in which.

Figure 1:
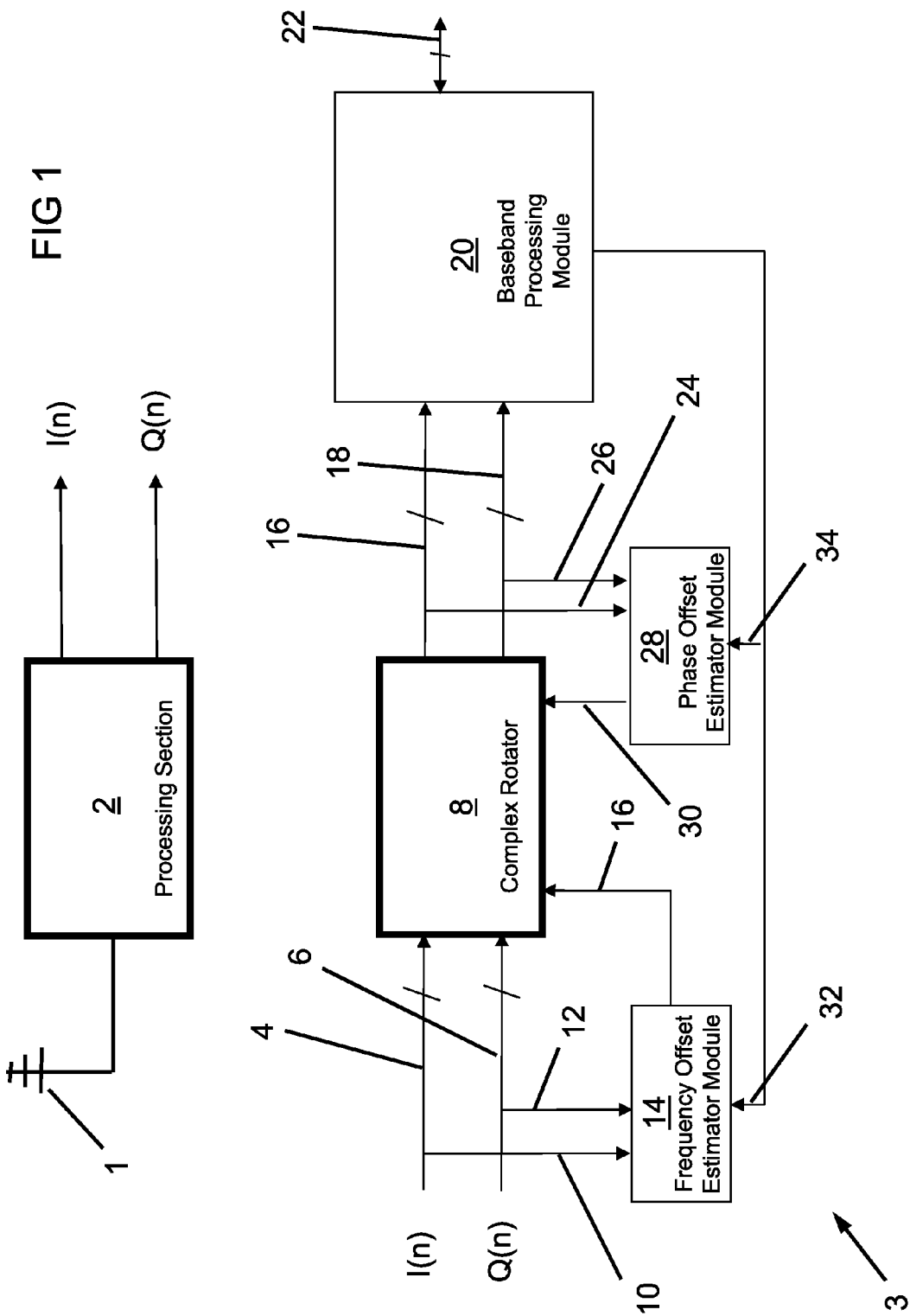
FIG. 1 is a schematic representation of part of the basic architecture of a digital radio receiver.

Turning first to FIG. 1 there may be seen part of the architecture of a digital radio receiver. In the upper part of the Figure may be seen a first section of the receiver comprising an antenna 1 and a processing section 2 which receives and amplifies the incoming RF signal, down-mixes this to an intermediate frequency (IF) signal and digitally samples the signal to generate an in-phase channel $1(n)$ and quadrature channel $Q(n)$ which is approximately 90 degrees out of phase with the I channel. The operation of this first section is well known per se to those skilled in the art.

A second section of the receiver is shown in the lower part of FIG. 1. The digital I and Q samples $I(n)$ and $Q(n)$ form inputs 4,6 to a digital complex rotator block 8 which is described below. They also provide inputs 10, 12 to a carrier frequency offset estimator 14. The frequency offset estimator 14 estimates the difference between the real carrier frequency and the theoretical nominal carrier frequency. It then provides a signal 16 to the complex rotator 8 to indicate the degree of frequency offset compensation it should apply to take account of the frequency offset.

The I and Q outputs of the complex rotator block 8 provide inputs 16, 18 to a baseband processing module 20 which performs bit recovery and thus provides a digital signal at its output 22. The complex rotator outputs also provide respective inputs to a phase offset estimator module 28. The phase offset estimator 14 estimates the difference between the carrier phase and the theoretical nominal carrier phase. It then provides a signal 30 to the complex rotator block 8 to indicate the degree of phase offset compensation it should apply.

The baseband processing module 20 also provides inputs 32, 34 to the frequency offset estimator module 14 and the phase offset estimator module 28 respectively.

The complex rotator block 8 performs down-mixing of the IF I and Q samples to baseband (assuming that the IF is non-zero) and also supports coherent demodulation by de-rotating the I and Q samples according to the estimated carrier frequency offset and carrier phase offset signals 16, 30 derived from the carrier frequency and phase offset estimators 14, 28. A phase accumulator is located in the complex rotator block 8.

Figure 2:
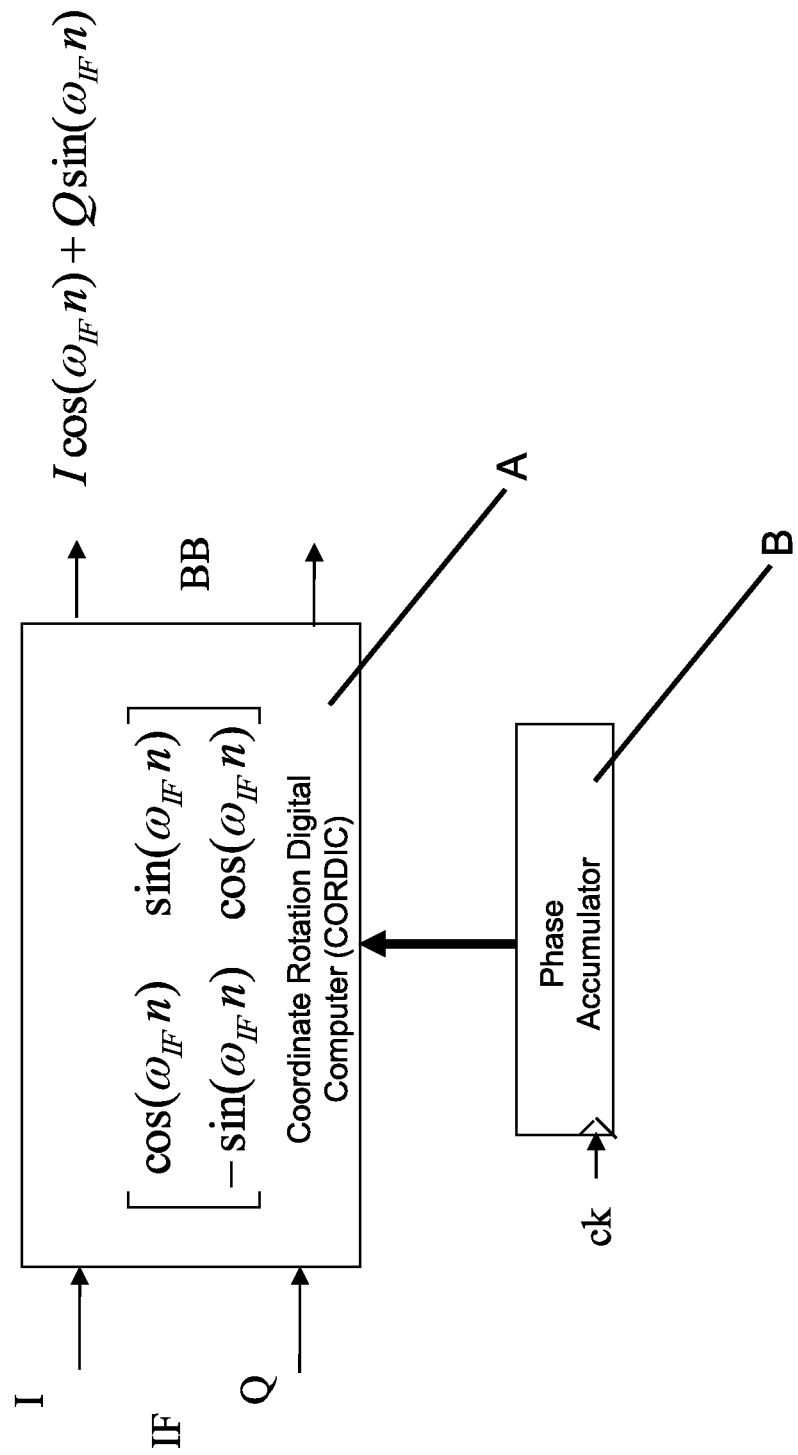
FIG. 2 is a schematic representation of a prior art complex rotator arrangement.

FIG. 2 shows schematically a typical prior art implementation of a digital complex rotator. This comprises a Coordinate Rotation Digital Computer (CORDIC) A and a phase accumulator B. The phase accumulator B receives a clock input ck and determines a de-rotation to be applied to the complex I and Q IF signals during down-mixing. The de-rotation matrix applied to the samples by the CORDIC A is illustrated inside the box. Thus the outputs are $I \cos(\omega_{IF} n) + Q \sin(\omega_{IF} n)$ and $-I \sin(\omega_{IF} n) + Q \cos(\omega_{IF} n)$ respectively.

The arrangement shown in FIG. 2 is effective in theory for carrying out the required complex rotation but this assumes that there is no phase or gain mismatch between the I and Q channels. In general in a practical device both are likely to be present to some extent.

Figure 3:
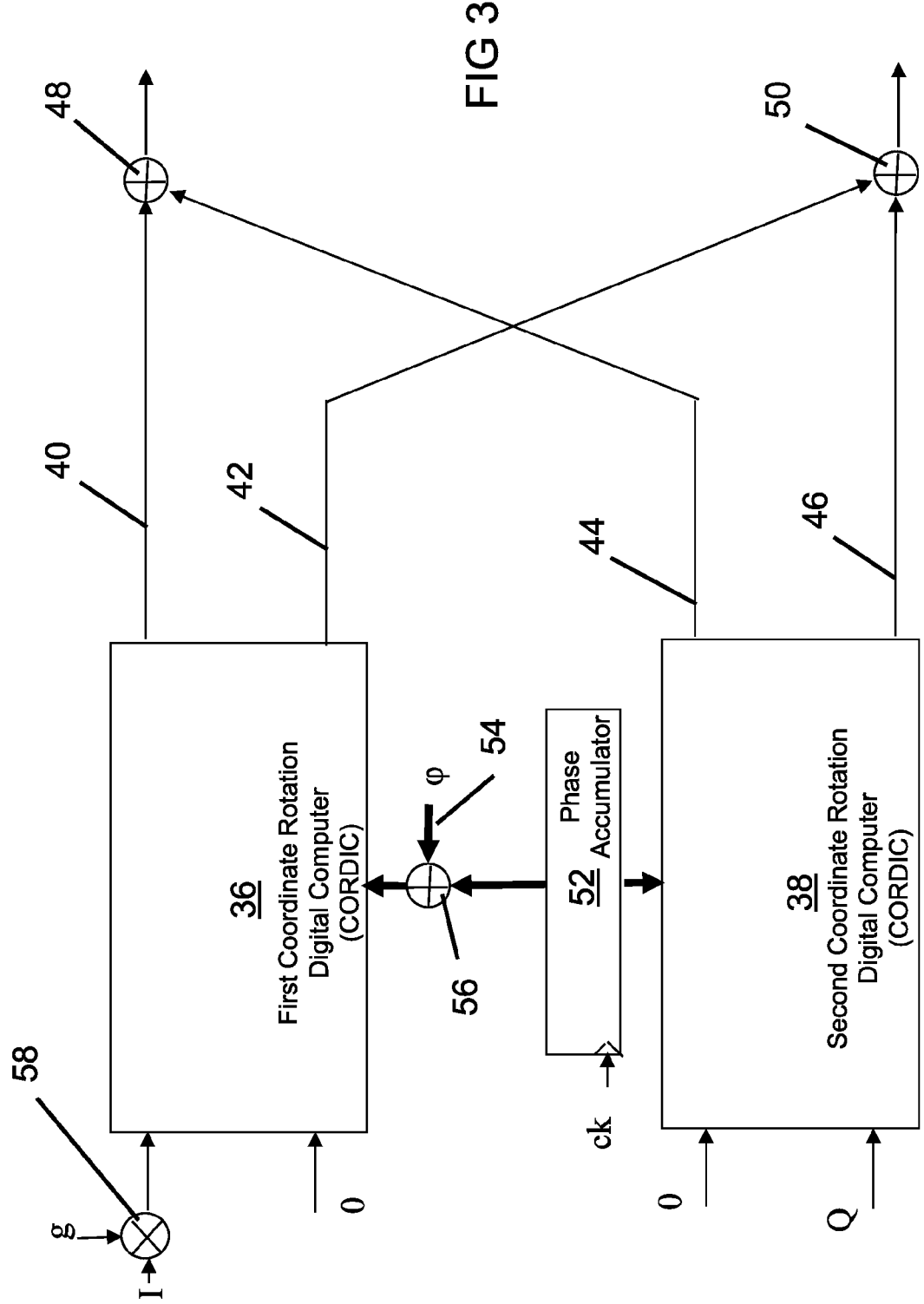
FIG. 3 is a schematic representation of an arrangement in accordance with the invention.

FIG. 3 illustrates the general arrangement of an embodiment of the invention which addresses these problems. Rather than the I and Q digital samples being handled by a single CORDIC in order to perform down-mixing and complex rotation thereof, in this embodiment of the invention they are handled by different respective CORDICs 36, 38 with the second input of each CORDIC 36, 38 being held at zero. The outputs 40, 42 of the first CORDIC 36 are added to the corresponding outputs 44, 46 of the second CORDIC 38 using respective adders 48, 50. As will be shown below with reference to FIG. 4, this gives the desired complex rotation behaviour of a single CORDIC.

However the present embodiment also allows for compensation of phase mismatch and gain mismatch between the I and Q channels. As will be seen a common phase accumulator 52 is used to control both CORDICs 36, 38 but an additional phase shift signal 54 is added to the signal output from the phase accumulator 52 to one of the CORDICs 36 by means of an adder 56. This allows the complex rotation applied to the I channel to be altered relative to that applied to the Q channel by an amount φ equivalent to the estimated phase mismatch.

Compensation for gain mismatch is achieved by means of an amplifier 58 applied to the input to one of the CORDICs 36. This allows a compensatory gain factor g to be applied only to the I channel to compensate for mismatch between the gain of the I and Q channels. The gain mismatch compensation happens to be applied to the same CORDIC 36 as the phase mismatch compensation in this embodiment but that is not essential.

Figure 4:
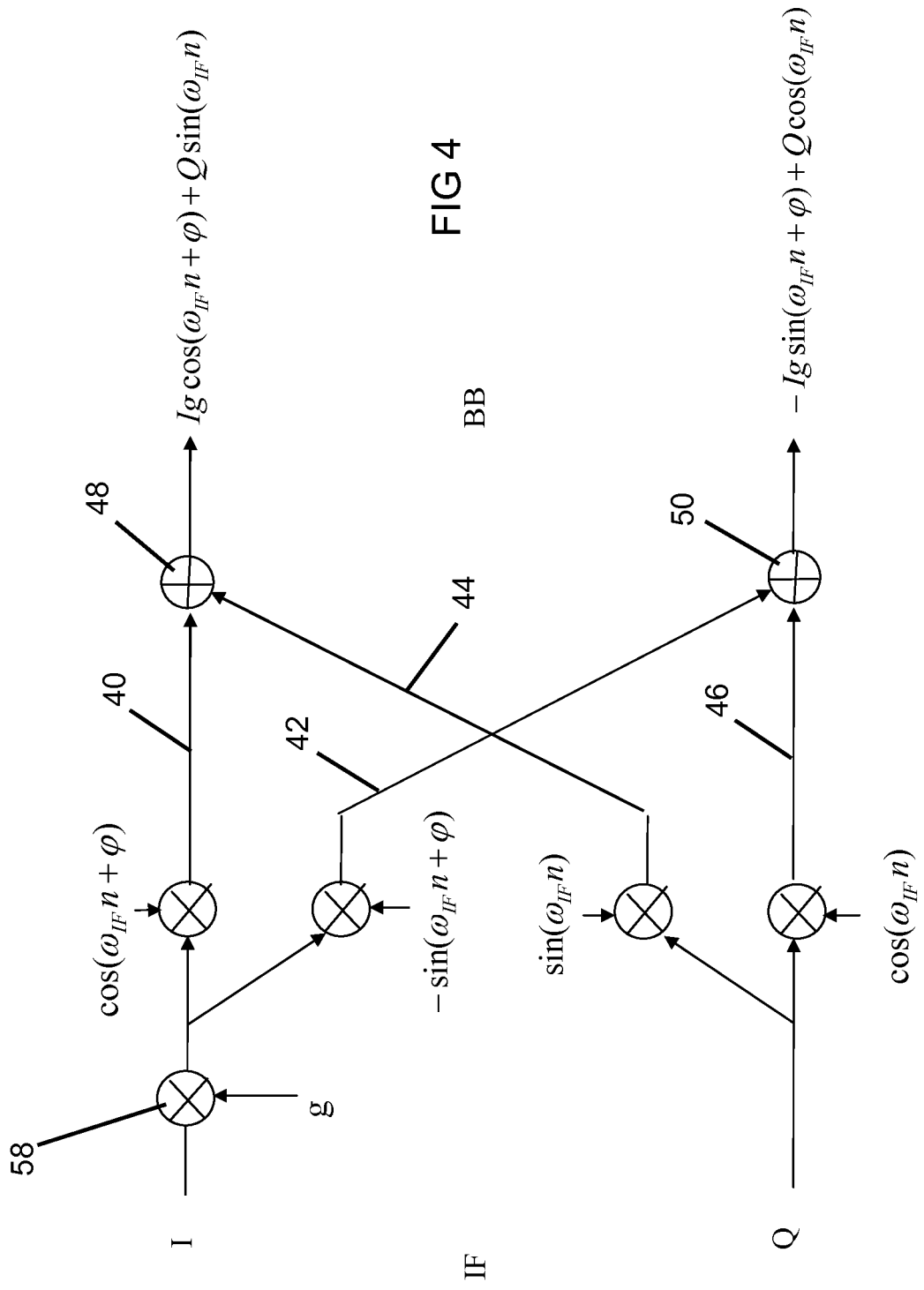
FIG. 4 is a more detailed functional representation of the calculations carried out to determine phase and gain mismatch compensation.

FIG. 4 shows the calculations that are carried out by the arrangement shown in FIG. 3. The CORDICs 36, 38 carry out the same matrix calculations as indicated by item A in FIG. 2 although the zero input for each means that only one of the diagonals for each is non-zero. Thus the first output 40 from the first CORDIC 36 (see FIG. 3) is $Ig \cos(\omega_{IF} n + \phi)$. In other words the I channel is multiplied by the compensatory gain factor g and is multiplied by the cosine of the signal from the phase accumulator modified by the offset for phase mismatch compensation, φ. The first output 44 from the second CORDIC 38 is $Q \sin(\omega_{IF} n)$ These are added together at the adder 48 to give $Ig \cos(\omega_{IF} n + \phi) + Q \sin(\omega_{IF} n)$. This is the equivalent of the first output of the single CORDIC A in FIG. 2 but with the gain and phase mismatch compensation factors φ, g.

Similarly the second output 42 of the first CORDIC 36 is $-Ig \sin(\omega_{IF} n + \phi)$ and the second output 46 of the second CORDIC 38 is $Q \cos(\omega_{IF} n)$ When these are added by the adder 50 the result is $-Ig \sin(\omega_{IF} n + \phi) + Q \cos(\omega_{IF} n)$ Again this is the equivalent of the second output of the single CORDIC A in FIG. 2 but with gain and phase mismatch compensation.

Thus it will be seen by those skilled in the art that by employing two CORDICs in parallel the embodiment of the invention described above is able to support coherent demodulation by allowing simultaneous complex rotation with I/O phase and gain mismatch compensation. Although this gives rise to a degree of redundancy, this is less than the addition of a full CORDIC since logic synthesis may exploit that one of each of the CORDIC inputs is constant zero.

Phase mismatch compensation is applied to the signal as part of the down-mixing complex rotation. Applying compensation as part of the mixing using two parallel CORDICs gives full flexibility in the choice of intermediate frequency.

The invention claimed is:

1. A digital radio receiver comprising:
    a first section arranged to receive an analogue radio signal and to generate therefrom digital intermediate frequency I and Q channel samples,
    a second section arranged to convert said I and Q channel samples to a lower, baseband frequency, said second section comprising:
        a first coordinate rotation digital computer module arranged to perform a complex rotation of the I channel samples;
        a second coordinate rotation digital computer module arranged to perform a complex rotation of the Q channel samples;
        a phase accumulator arranged to provide an output signal representing a complex rotation to be applied to each of the I and Q channel samples,
    wherein the second section is arranged such that the phase accumulator output signal is modified by a phase offset signal that provides a net difference in the complex rotation which the first and second coordinate rotation digital computer modules are directed to apply prior to being supplied to one of the first and second coordinate rotation digital computer modules.

2. A digital radio receiver as claimed in claim 1 arranged to measure a phase mismatch between said I and Q channels and using said phase mismatch to generate said phase offset signal.

3. A digital radio receiver as claimed in claim 1 wherein said complex rotation of the I channel samples is determined by a measured phase offset between the analogue radio signal and a nominal phase of said signal.

4. A digital radio receiver as claimed in claim 1 comprising an amplifier arranged to apply a compensatory gain to an input or output of one of the first and second coordinate rotation digital computer modules.

5. A digital radio receiver as claimed in claim 4 arranged to measure a gain mismatch between said I and Q channel samples and using said gain mismatch to determine said compensatory gain.

6. A digital radio receiver as claimed in claim 1 wherein each of the first and second coordinate rotation digital computer modules has two inputs and one of the inputs of each of the first and second coordinate rotation digital computer modules is held at zero.

7. A digital radio receiver as claimed in claim 1 wherein said complex rotation of the Q channel samples is determined by a measured phase offset between the analogue radio signal and a nominal phase of said signal.

* * * * *